(12) United States Patent
Langvardt Krogh (10) Patent No.: US 11,767,823 B2
(45) Date of Patent: Sep. 26, 2023

(54) APPARATUS FOR SEALING ROTATABLE COMPONENTS OF A WIND TURBINE POWERTRAIN

(71) Applicant: Vestas Wind Systems A/S, Aarhus N (DK)

(72) Inventor: Lars Langvardt Krogh, Egå (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/641,969

(22) PCT Filed: Oct. 2, 2020

(86) PCT No.: PCT/DK2020/050269
§ 371 (c)(1),
(2) Date: Mar. 10, 2022

(87) PCT Pub. No.: WO2021/083466
PCT Pub. Date: May 6, 2021

(65) Prior Publication Data
US 2022/0307481 A1 Sep. 29, 2022

(30) Foreign Application Priority Data
Oct. 31, 2019 (DK) .......................... PA 2019 70675

(51) Int. Cl.
*F03D 80/00* (2016.01)
*F03D 15/00* (2016.01)
*F16J 15/3204* (2016.01)

(52) U.S. Cl.
CPC ............. *F03D 80/00* (2016.05); *F03D 15/00* (2016.05); *F16J 15/3204* (2013.01); *F05B 2240/57* (2013.01); *F05B 2240/60* (2013.01)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS 2,646,999 A 7/1953 Barske
8,444,153 B2 5/2013 Gaebler et al.
(Continued)

FOREIGN PATENT DOCUMENTS

EP 2080904 A1 7/2009

OTHER PUBLICATIONS

Danish Patent and Trademark Office, Search and Examination Report in PA 2019 70675, dated Apr. 21, 2020.
(Continued)

*Primary Examiner* — Nathan Cumar
(74) *Attorney, Agent, or Firm* — Wood Herron & Evans LLP (57) ABSTRACT

Apparatus comprising a first shaft and a second shaft supported in a substantially concentric relationship so that they are able to rotate relative to one another about a rotational axis (R); wherein one of the first and second shafts passes through a bore defined in the other of the first and second shafts; a seal arrangement between the first and second shafts, said seal arrangement being locked from rotational movement relative to said first shaft; wherein the seal arrangement comprises a first portion that is rotatably mounted on the second shaft by a bearing and a second portion that is configured to seal against a miming surface defined by the second shaft. Advantageously, since the seal arrangement is rotatably mounted on the same shaft against which it forms a seal, the sealing arrangement accommodates for alignment errors between the first and second shafts.

18 Claims, 6 Drawing Sheets

(58) Field of Classification Search
CPC ............... F16J 15/3212; F05B 2240/00; F05B 2240/57; F05B 2240/60; F03D 15/00; F03D 80/00
USPC ......................................................... 277/549
See application file for complete search history.

(56) References Cited

U.S. PATENT DOCUMENTS

| | | | |
|---|---|---|---|
| 10,359,029 | B2 | 7/2019 | Smet |
| 2010/0133854 | A1 | 6/2010 | Jansen et al. |
| 2015/0063981 | A1* | 3/2015 | Pierrot ................... F16J 15/34 415/111 |
| 2015/0107406 | A1* | 4/2015 | Tarbell ................ B60B 27/0073 29/893.2 |
| 2016/0003302 | A1* | 1/2016 | Seno ................... F16J 15/3232 277/351 |
| 2016/0341183 | A1 | 11/2016 | Smet |
| 2017/0130701 | A1* | 5/2017 | Kaiser ................... F03D 80/88 |

OTHER PUBLICATIONS

European Patent Office, International Search Report and Written Opinion in PCT Application No. PCT/DK2020/050269, dated Dec. 16, 2020.

* cited by examiner

FIG. 8

APPARATUS FOR SEALING ROTATABLE COMPONENTS OF A WIND TURBINE POWERTRAIN

FIELD OF THE INVENTION

The invention relates to a scheme or apparatus for sealing rotatable components in a wind turbine drive train.

BACKGROUND OF THE INVENTION

In a typical 'horizontal axis' wind turbine, a nacelle mounted on a tower supports a rotor that includes a plurality of blades. The nacelle houses a main bearing arrangement which supports the rotor so that it is able to rotate as the blades are driven by the wind. The rotor is supported on the input end of a powertrain of the wind turbine which typically includes a gearbox and a generator, although direct drive wind turbines are known that do not include a gearbox. In a known configuration, the main rotor of the wind turbine is coupled to a so-called 'low-speed' shaft which is in turn coupled to the input end of the gearbox. The gearbox also includes a high-speed output shaft which is coupled to the generator.

In some wind turbine powertrains, the powertrain includes a conduit that extends along its rotational axis and which serves to carry electrical and/or hydraulic services to the rotating hub. This conduit is often referred to as a 'pitch tube' by those skilled in the art. One of the challenges with this approach is that the pitch tube must be located precisely in order to pass through the generator and the gearbox safely. What is more, the pitch tube passes through different environments such as air filled and oil filled cavities, so the pitch tube must be sealed against its surrounding components to guard against contamination and leakage.

Known approaches to seal the running surfaces of rotating shafts include annular lip seals and labyrinth seals. These are two examples, but others are known. In both approaches, it is important that the rotating shaft is supported in an accurate concentric orientation with respect to the annular seal. Excessive tolerance results in increased wear and less effective sealing functionality. In the case of a pitch tube, it can be the case that the sealing position on the shaft is displaced along the shaft axis a significant distance from where the shaft is rotationally supported and this may lead to concentricity issues.

It is against this background that the invention has been devised.

SUMMARY OF THE INVENTION

According to a first aspect of the invention there is provided apparatus comprising a first shaft and a second shaft supported in a substantially concentric relationship so that they are able to rotate relative to one another about a rotational axis; wherein one of the first and second shafts passes through a bore defined in the other of the first and second shafts. A seal arrangement is located between the first and second shafts, locked from rotational movement relative to the first shaft, and comprises a first portion that is rotatably mounted on the second shaft by a bearing and a second portion that is configured to seal against a running surface defined by the second shaft.

Advantageously, since the seal arrangement is rotatably mounted on the same shaft against which it forms a seal, the sealing arrangement accommodates for alignment errors between the first and second shafts. This may particularly be the case where both shafts are rotatable. But it may also be the case where the outer shaft is stationary and in effect forms a housing for the inner shaft. In either situation, lateral movement of the inner shaft transverse to the rotational axis may be significant, particularly where that shaft is supported by bearings which are remote from the sealing point.

The invention has particular use in a wind turbine application, where the first shaft is a gearbox output shaft and the second shaft is a pitch tube that passes through the gearbox output shaft.

In one embodiment, the seal arrangement comprises a radial surface that opposes the first shaft thereby defining an annular gap. The annular gap provides in effect a cushion which accommodates alignment errors between the first and second shafts. In order to close this gap, the seal arrangement may include a flexible annular seal. The annular seal may take various forms suitable to close the gap and prevent leakage of fluids therethrough. However, in one embodiment the annular seal take the form of a sealing ring which is flattened in form to resemble an annular membrane.

The flexible annular seal may extend between a surface of the first shaft and a surface of the seal arrangement to close the annular gap. In this way, the flexible annular seal in effect locks the rotational movement of the seal arrangement to the rotational movement of the first shaft. This can be particular advantageous in circumstances where the first shaft has a relatively high rotational speed to the second shaft as the high rotational speed imparted to the seal arrangement can improve the operation of the seal.

In order not to affect the rotation of either of the two shafts, the bearing on which the first portion of the seal arrangement is mounted to the first second shaft preferably provides a very low friction interface. In one embodiment the bearing may be a roller bearing, although friction bearings and ball bearings are other options.

Notably, in some embodiments the bearing that supports the sealing arrangement on the respective shaft is different to, that is to say, it is not the same as the bearing arrangement that rotatably supports that shaft with respect to the other shaft.

The seal arrangement may be selected to provide an effective seal for the particular application that the apparatus is intended for use. In some circumstances it may be preferable to use a type of labyrinth seal. This may be the case where the speed differential between the two shafts is high, for example between 300 and 400 rpm, and so a low friction seal is particularly desirable. In other circumstances, other rotational seals may be appropriate, for example lip seals.

In the above apparatus, the first portion and the second portion of the seal arrangement may be defined by a seal member. Suitably, the sealing member may be defined by a single part and may be shaped to accommodate the bearing within it, therefore providing a particular compact and elegant configuration.

Notably the seal arrangement is compact and so does not take up excessive space between shafts. For example: in one embodiment, the second portion of the sealing arrangement is separated from the bearing by an axial distance along the rotational axis that is less than the radial distance of an annular volume defined between the first shaft and the second shaft; in one embodiment the axial length of the sealing arrangement taken along the rotational axis is substantially the same as a radial distance of an annular volume defined between the first shaft and the second shaft.

In another aspect, the invention provides an apparatus comprising a housing defining an internal bore, a shaft that extends through the internal bore and which is rotatably mounted with respect to the housing so as to rotate around a rotational axis (R); a seal arrangement between the internal bore of the housing and the shaft, locked from rotational movement relative to said housing; wherein the seal arrangement comprises a seal member that is spaced from the internal bore of the housing and includes a first portion that is rotatably supported on the shaft by a bearing and a second portion that is configured to seal against a running surface defined by the shaft.

Notably, in this embodiment the bearing that supports the sealing arrangement on the respective shaft may be different to, that is to say, it is not the same as the bearing arrangement that rotatably supports that shaft with respect to the housing.

It will be appreciated that preferred and/or optional features of the first aspect of the invention may be combined with the other aspects of the invention. The invention in its various aspects is defined in the independent claims below and advantageous features are defined in the dependent claims below.

BRIEF DESCRIPTION OF THE DRAWINGS

The above and other aspects of the invention will now be described, by way of example only, with reference to the accompanying drawings, in which.

Note that features that are the same or similar in different drawings are denoted by like reference signs.

DETAILED DESCRIPTION OF EMBODIMENTS OF THE INVENTION

The invention relates to an arrangement of a shaft rotating in a housing which is provided with a dynamic seal. The housing may be stationary, but the invention has particular use in embodiments where the housing is itself a rotating shaft so that the arrangement comprises a pair of coaxial and nested shafts rotating at different speeds with a seal between them. In such an arrangement, providing an adequate seal between the shafts can be challenging, particularly if one or other of the shafts has tolerance errors which compromise the mutual concentricity of the shafts.

Such sealing arrangements may be applied in many different industries, but in order to give the invention a context in which it will be better understood, the technology will now be described in more detail with reference to a wind turbine where a so-called pitch tube extends axially through a hollow rotating shaft. As is known by the skilled person, a pitch tube is a hollow shaft that passes through one or more sections of the wind turbine powertrain in order to provide a protected conduit for hydraulic and electrical services between the stationary reference frame of the nacelle and the rotating reference frame of the hub. However, sealing the pitch tube reliably and where needed within the interior of the powertrain components is challenging.

Figure 1:
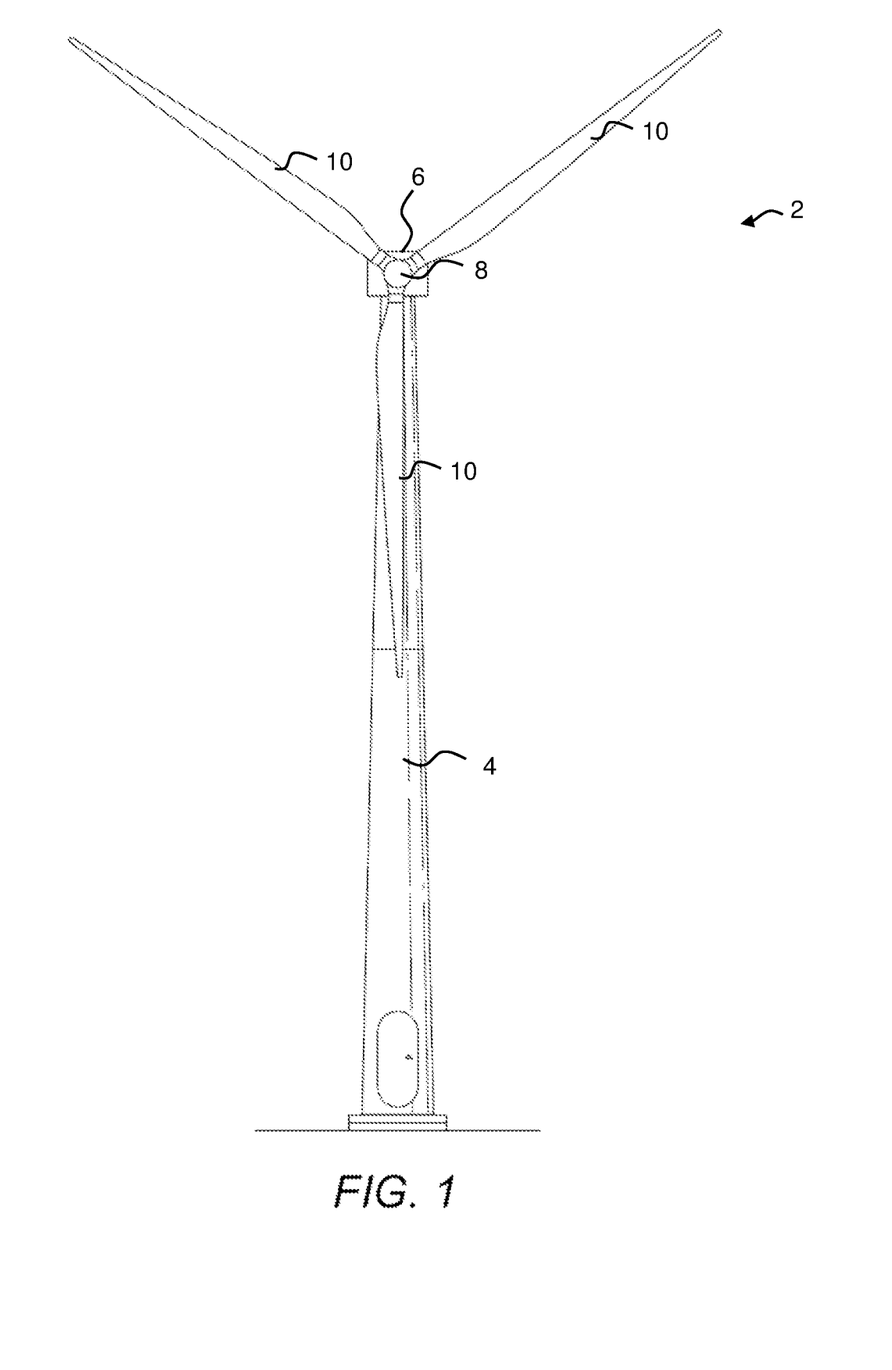
FIG. 1 is a front view of a wind turbine in which embodiments of the invention may be implemented.
Figure 2:
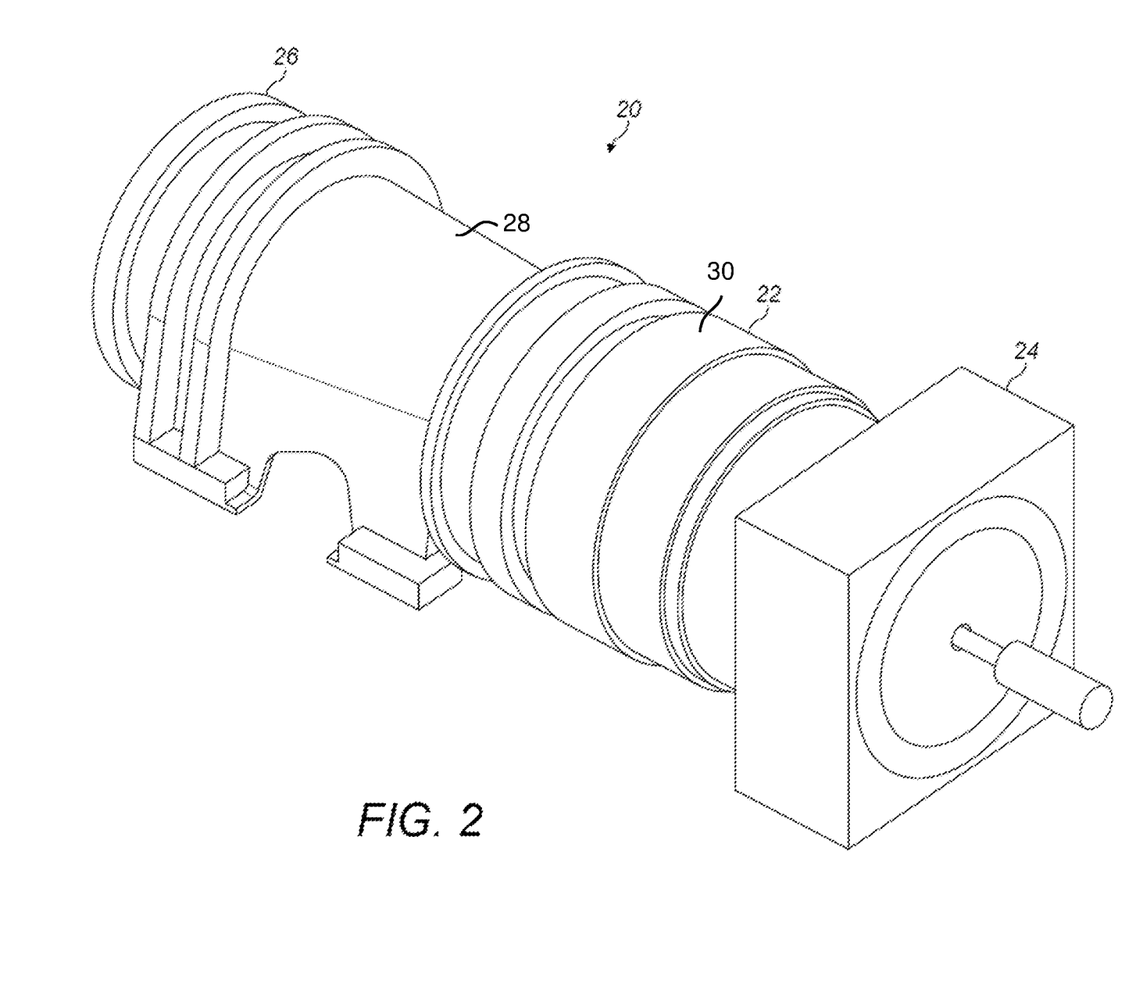
FIG. 2 is a perspective view of an example of a wind turbine powertrain which may be housed within the wind turbine of FIG. 1, and to which embodiments of the invention are applicable.

In order to place the embodiments of the invention in a suitable context, reference will firstly be made to FIG. 1 which illustrates a typical Horizontal Axis Wind Turbine (HAWT) 2 that includes an electrical power generating arrangement, as is shown in FIG. 2. Although this particular image depicts an on-shore wind turbine, it will be understood that equivalent features will also be found on off-shore wind turbines. In addition, although such wind turbines are referred to as 'horizontal axis', it will be appreciated by the skilled person that for practical purposes, the axis is usually slightly inclined to prevent contact between the rotor blades and the wind turbine tower in the event of strong winds.

The wind turbine 2 comprises a tower 4, a nacelle 6 rotatably coupled to the top of the tower 4 by a yaw system (not shown), a rotating hub or 'rotor' 8 mounted to the nacelle 4 and a plurality of wind turbine rotor blades 10 coupled to the hub 8. The nacelle 4 and rotor blades 10 are turned and directed into the wind direction by the yaw system.

As mentioned above, the nacelle 6 houses an electrical power generating arrangement 20, which includes a powertrain or drivetrain. Both terms are used in the technical art, and 'powertrain' will be used from now on for consistency. As will be understood by those skilled in the art, the wind turbine powertrain comprises a gearbox 22, and a generator 24 which are driven by a main shaft 26.

The main shaft 26 is supported by a main bearing housing 28 and is connected to, and driven by, the rotor 8 thereby providing input drive to the gearbox 22. The gearbox 22 steps up the rotational speed of the low speed main shaft 26 via internal gears (not shown) and drives a gearbox output shaft (not shown in FIG. 2). The gearbox output shaft in turn drives the generator 24, which converts the rotation of the gearbox output shaft into electricity. The electricity generated by the generator 24 may then be converted by other components (not shown) as required before being supplied to an appropriate consumer, for example an electrical grid distribution system.

With reference generally to the gearbox 22, its housing 30 is generally cylindrical in form, which is due to the specific type of gearbox that is used in this particular powertrain arrangement. As the skilled person would know, an epicyclic gearbox comprises a series of planet gears that are arranged about a central sun gear, and which collectively are arranged within an encircling ring gear. Such a gearbox may include more than one stage of planet gears. The ratio of the number of teeth between the ring gear, the planet gear and the sun gears may be used to determine the gear ratio of the gearbox. For clarity, fine detail of the gearbox will not be described in further detail here as the gearbox is not the principal subject of the invention. Suffice to say that other gearbox configurations could also be used.

Figure 3:
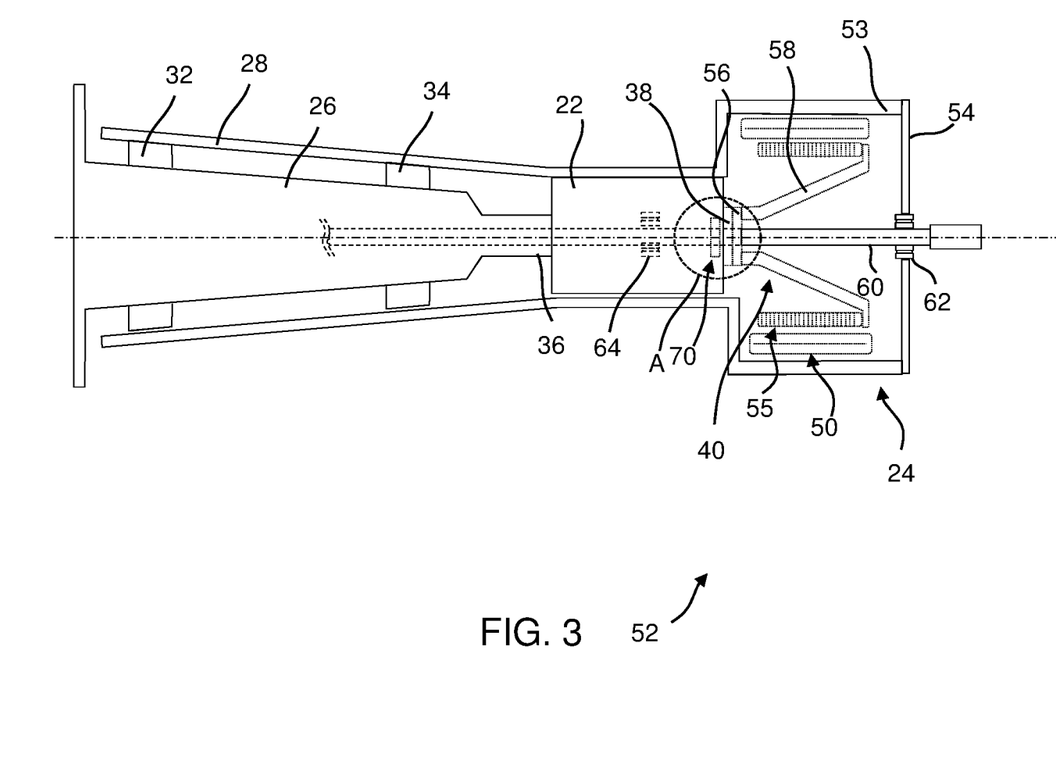
FIG. 3 is a schematic side view of the powertrain shown in FIG. 2.

Further details of the powertrain will now be described with reference also to FIG. 3 which shows some components more clearly. It should be noted here FIG. 3 is schematic in form and so for brevity and clarity some components of the generator are not shown or described so as not to detract from the focus of this discussion.

As can be seen, the main shaft 26 is supported in the main bearing housing 28 by a front bearing 32 and a rear bearing 34. The axially-spaced bearings 32,34 ensure that the main shaft 26 is supported securely to rotate about the main rotational axis, shown here as R, despite the high loads that are imposed upon it. Since the gearbox 22 is an epicyclic gearbox, the main shaft 26, the gearbox 22 and the generator 24 are all centred on and share the same rotational axis R.

The main shaft 26 is coupled to the gearbox 22 at a gearbox input shaft 36. Similarly, the gearbox 22 is coupled to the generator 24 by a gearbox output shaft 38. More specifically, the gearbox output shaft 38 is coupled to a rotor 40 of the generator 24, hereinafter 'generator rotor'.

Turning now to the generator 24, in the arrangement shown it is an IPM (interior permanent magnet) electric machine having an external stator 50 which surrounds the generator rotor 40. By 'external', it is meant that the generator stator 50 is in a radially outer position relative to the generator rotor 40 and surrounds it as compared to generator designs in which the rotor is external to the stator. The magnetically active components of the generator 24 are contained within a generator housing 53 which in this arrangement is cuboidal in form, as can be seen in FIG. 2.

A cylindrical magnet package 55 is supported on the generator rotor 40 and is arranged to rotate around the rotational axis R. The magnet package 55 is supported by a generator rotor hub 56 and a support flange 58. The exact structural configuration of the generator rotor hub 56 and the support flange 58 is not critical. However, functionally these components serve to transmit drive from the generator rotor hub 56, as transmitted from the gearbox, through the support flange 58 to the magnet package 55, thereby ensuring that the magnetically active parts of the generator rotor 40 are coupled to the gearbox output shaft 38.

As is common in many designs of wind turbine powertrain, an elongate hollow conduit or shaft in the form of a "pitch tube" 60 is provided in order to transfer hydraulic and electrical services from the stationary frame of the nacelle to the rotating frame of the main rotor hub. As is shown in the figures, the pitch tube 60 extends along the rotational axis R and passes through the generator 24, the gearbox 22 and extends into the main shaft 26. The precise form of the pitch tube is not crucial to the invention and so further explanation is omitted.

Although the pitch tube 60 passes through powertrain components that rotate at a relatively high rotational frequency, such as the gearbox output shaft 38 and the generator rotor 40, the pitch tube 60 rotates at the same frequency as the main shaft 26. Therefore, the pitch tube 60 must be supported rotationally with respect to the generator rotor 40 and the gearbox output shaft 38. For this purpose the pitch tube 60 is rotationally supported by suitable bearings at various points along its axial length. The precise configuration of the bearings is not critical but, as shown in FIG. 3, in this arrangement the pitch tube 60 is supported at a first (rear) bearing 62 and a second (front) bearing 64. The rear bearing 62 is located at a central aperture provided in a rear face 54 of the generator housing 53, and the front bearing 64 is defined within the gearbox 24, and is shown schematically in FIG. 3. Together the two bearings 62, 64 function to support the pitch tube 60 in a concentric relationship relative to the gearbox 24 and the generator 22 about rotational axis R. The skilled person would appreciate that other configurations are acceptable.

Since the pitch tube 60 extends through different components of the powertrain, suitable seals are necessary to ensure that ambient environments of the powertrain are not contaminated by oil-filled environments. For instance, the internal environment of the generator needs to be protected from oil and grease inside the gearbox. However, the sealing demands can be challenging to satisfy because it can be difficult to ensure that the pitch tube is truly concentric with the gearbox output shaft. In circumstances where the pitch tube is slightly misaligned, the effectiveness of conventional rotational seals may be compromised which can lead to admittance of oil mist into the generator and increased wear on the running surface of the pitch tube.

To this end, the embodiments of the invention provide a seal arrangement 70 which serves to seal the pitch tube 60 against the high speed output shaft 38 of the gearbox. An embodiment of the seal arrangement 70 is indicated generally in FIG. 3. However, due to the scale of the drawing, a more detailed view of the circled region A of FIG. 3 is shown schematically in FIG. 4.

Figure 4:
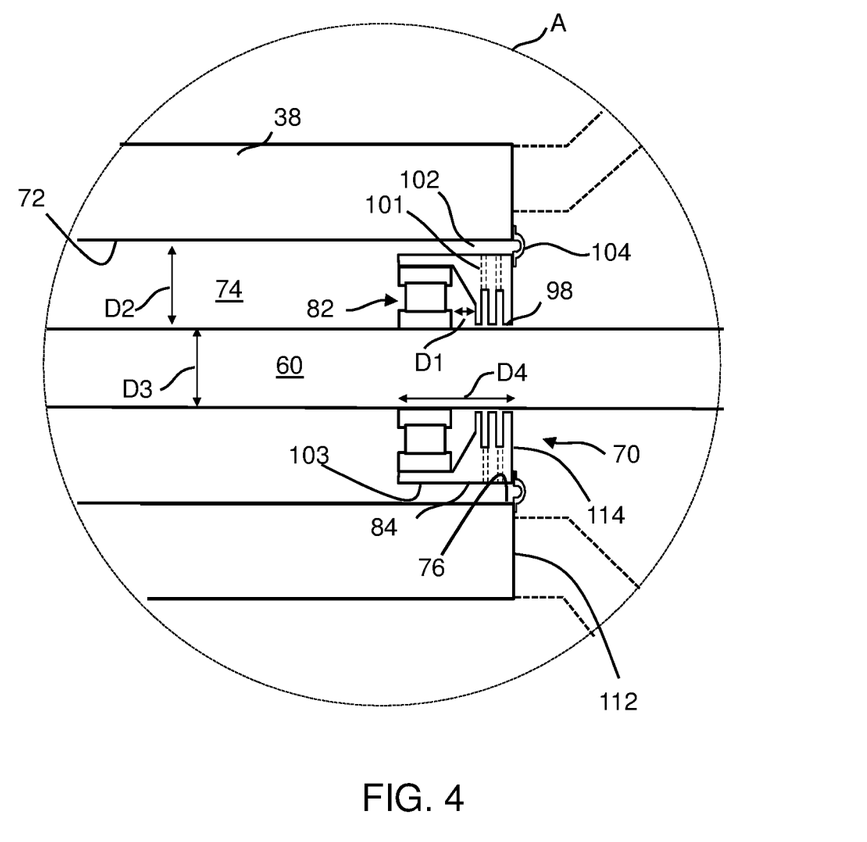
FIG. 4 is a schematic view of a portion of the powertrain in FIG. 3 illustrating an apparatus for sealing components of the powertrain in accordance with an embodiment of the invention.

At this point it should be noted that FIG. 4 can be considered to be a simplified view so as to focus on the main features of the inventive concept without obscuring them with unnecessary detail. Here, the gearbox output shaft 38 can be seen in a radially outer position relative to the pitch tube 60. It should be noted that details regarding how the gearbox output shaft 38 is rotationally supported are not shown for clarity in this view. However, the skilled person would understand that the gearbox 22 would be provided with suitable bearing arrangements to ensure that the output shaft is adequately supported.

The gearbox output shaft 38 is hollow and as such defines an axial internal bore 72. The pitch tube 60 passes through the internal bore 72 and, in this way, extends through the gearbox 22 from the generator side to the main shaft side. As has been mentioned, the pitch tube 60 is supported on respective bearings 62, 64 independent from the gearbox output shaft 38 so that the pitch tube 60 is able to rotate relative to the gearbox output shaft 38 about the rotational axis R. The gearbox output shaft 38 and the pitch tube 60 are therefore supported in mutually concentric orientations such that the pitch tube 60 is nested within the gearbox output shaft 38.

The pitch tube 60 has an outside diameter that is smaller than the internal diameter of the gearbox output shaft 38 so that an annular volume 74 is defined between these two components. It is this annular volume 74 that must be sealed in order to prevent contamination between the oil-laden environment inside the gearbox 22 and the ambient environment of the generator 24. To this end, the seal arrangement 70 is located in the annular volume 74 between the pitch tube 60 and the gearbox output shaft 38. More specifically, in this embodiment the seal arrangement 70 is located in the annular volume 74 in a position proximate to the opening 76 of the internal bore 72 of the gearbox output shaft 38.

In a typical rotating shaft seal, a seal member such as an annular lip seal would be mounted on the gearbox output shaft 38 and seal against a running surface of the pitch tube 60. However, such a conventional arrangement would be vulnerable to concentricity errors between the two shafts which could lead to excessive wear on the running surface of the pitch tube and/or increased leakage from the seal.

In contrast to the conventional arrangement as discussed above, notably the seal arrangement 70 of the invention is mounted, supported or otherwise affixed to the pitch tube 60. More specifically, the sealing arrangement 70 is rotatably mounted to the pitch tube 60 so that it is able to rotate relative to it. As can be seen in the Figures, the sealing arrangement 70 is mounted directly to the pitch tube 60 in that there are no other shafts or housing components between them. The sealing arrangement 70 is therefore fixed to the pitch tube 60 in such a way that it is able to rotate whilst fixed to the pitch tube. Expressed another way, the pitch tube 60 carries the sealing arrangement 70. Moreover, and as will be appreciated from the discussion that follows, it should be noted that the bearing that supports the sealing arrangement 70 on the pitch tube 60 is different to the bearing arrangement that rotatably supports the pitch tube and the gearbox output shaft 38. For the avoidance of doubt, it should be noted that this distinction applies to each embodiment of the invention discussed below.

In this embodiment the seal arrangement 70 includes two components; a bearing 82 and a seal member 84. The bearing 82 is shown here as a roller bearing as this is a convenient way to provide a low friction interface between the pitch tube 60 and the seal member 84. However, it is envisaged that other types of bearings would be acceptable, for example different types of ball bearings, roller bearings and friction bearings.

Figure 5:
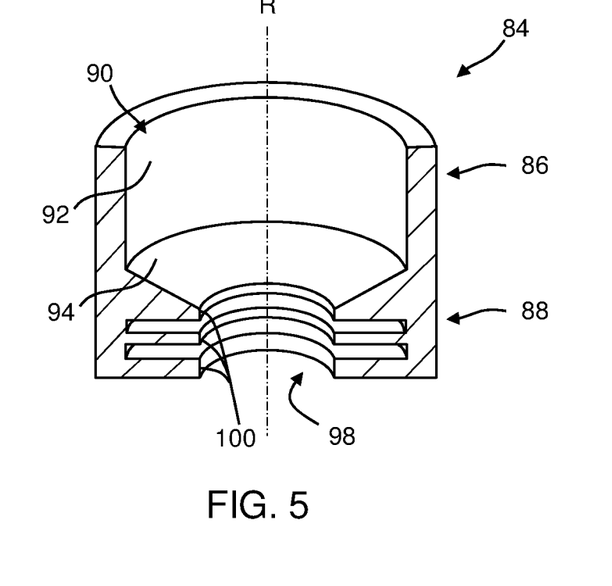
FIG. 5 is a perspective section view of a seal member in accordance with an embodiment of the invention.

Whereas FIG. 4 shows a side view of the seal member 84, FIG. 5 shows a perspective view in which detail may be better appreciated.

The seal member 84 in this embodiment is an annular component which is generally cylindrical in outer form. The interior form of the seal member 84 is shaped to define two sections: a first section 86 serves a connecting function to connect or fix the seal member 84 to the bearing 82; whilst a second section 88 serves the sealing function. The two sections 86,88 each define approximately half of the axial length of the seal member 84.

In the illustrated embodiment, the first section 86 of the seal member 84 includes a circular socket 90 defined by a cylindrical inner wall 92, the inner diameter of which is comparable to that of the outer diameter of the bearing 82 on which it is mounted. In the arrangement shown, the socket 90 has a frustoconical base or floor 94 at which point the first section 86 merges into the second section 88. The second section 88 therefore has thicker wall section compared to the first section 86.

The seal member 84 may be mounted on the bearing 82 by way of a press fit since the internal diameter of the socket 90 is comparable to the outer diameter of the bearing 82. Additional or alternative measures may be taken to ensure a secure fixing. For example, a suitable bonding agent may be applied to the contact surfaces of one or both of these components. Furthermore, a suitable circlip, set screw or pin arrangement may be integrated into the seal arrangement 70 to ensure that the seal member 84 is connected securely to the bearing 82. It is also envisaged that heat shrinking may be a suitable option for securing the seal member onto the bearing.

The second section 88 of the seal member 84 provides the sealing function. In this embodiment the second section 88 defines a labyrinth seal 98. It should be appreciated at this point that the precise form of seal is not crucial. As illustrated, the labyrinth seal 98 is depicted as a simple non-isolating radial labyrinth seal featuring a plurality of axially-spaced annular sealing fins 100 that are defined by the second section 88 of the seal member. In the usual way, the seal member 84 is configured such that the sealing fins 100 define a very small gap with the underlying running surface of the pitch tube 60 to provide a non-contact seal. Drain channels 101 are provided in the seal member 84 so that the fluid captured between the fins 100 can be expelled radially outwards. Other types of labyrinth seals would also be acceptable in this application, such as axial labyrinth seals and isolating labyrinth seals. For instance, the pitch tube could be provided with counter fins that extend radially in a direction away from the pitch tube and interdigitated with the fins of the sealing member. Moreover, other seal types such as lip seals could be used. Combinations of seal types may also be used. The skilled person would understand, however, that different types of seal may increase the complexity of the arrangement.

The seal member 80 may be made from any suitable material. Different materials may be more suited to different applications. For example, types of engineering plastics and rubbers (e.g. nylon, PEEK, FKM or EPDM) may be suitable for some applications, as would metal seals (e.g. steel).

Advantageously, since the seal arrangement 70 is rotatably mounted on the pitch tube 60, the sealing fins 100 of the seal member 84 are accurately positioned with respect to the opposed running surface irrespective of how accurately the pitch tube 60 is mounted with respect to the gearbox output shaft 38. This ensures an accurate seal is established.

Referring specifically to FIG. 4 it will be noted that the outer diameter of the seal arrangement 70 is less than the internal diameter of the gearbox output shaft 38. This ensures that the seal arrangement 70 is able to run freely within the annular volume 74 and also provides space to accommodate eccentric mounting between the pitch tube 60 and the gearbox output shaft 38. Due to the difference in diameters, an annular gap 102 is defined between the radially outer surface 103 of the pitch tube 60 and the internal bore 72. Expressed another way, the seal member 84 is spaced from the internal bore 72. It will be noted that any eccentricity in how the pitch tube 60 is mounted with respect to the gearbox output shaft 38 will cause the annular gap 102 to be non-uniform around its circumference. In effect, therefore, it may be considered that any tolerance between the pitch tube 60 and the gearbox output shaft 38 is transferred radially outwards to the annular gap 102 between the seal arrangement 70 and the gearbox output shaft 38.

Figure 6:
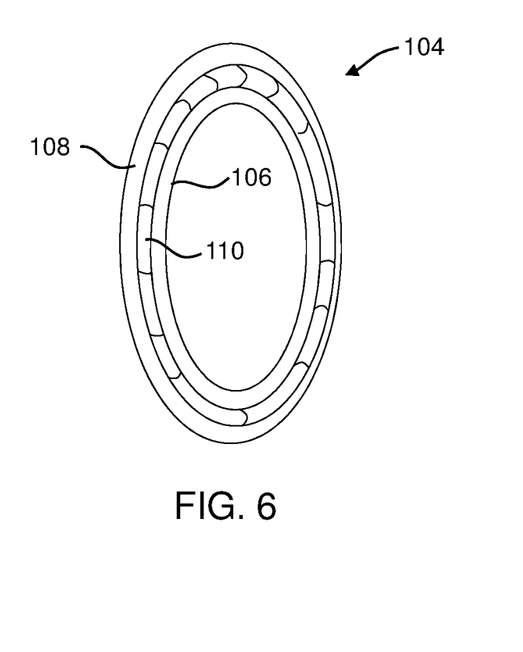
FIG. 6 is a perspective view of an annular ring seal in accordance with an embodiment of the invention.

In order to seal the annular gap 102, the seal arrangement 70 includes a cover in the form of a flexible annular seal 104 that closes the annular gap 102. The flexible annular seal 104 is also shown in FIG. 6 in perspective view.

In the illustrated embodiment, the flexible annular seal 104 is in the form of a ring or membrane seal. The ring seal 104 is shaped so as to be generally planar in cross section. When installed in the annular gap 102, the plane of the ring seal 104 is transverse to the rotational axis R. The planar shape of the ring seal 104, together with the material from which it is made, provides it with radial resilience so that it is able to stretch in the radial direction in order to accommodate non-uniformity in the annular gap 102. Although it is envisaged that a flat ring would be acceptable for the ring seal 104, the illustrated embodiment is shaped to provide a greater degree of flexibility.

Figure 7:
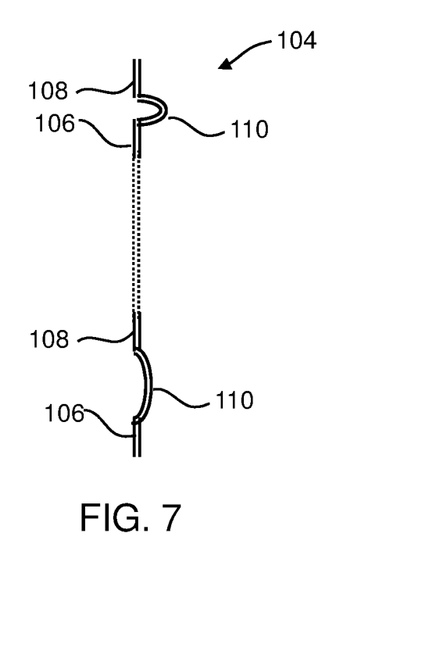
FIG. 7 is a diagrammatic view of the annular ring seal of FIG. 6 shown being stretched asymmetrically.

To this end the ring seal 104 comprises radially inner and outer flanges or lips 106, 108 which are connected by an intermediate ridge, rib or bridge 110. The curved shape of the bridge 110 links the inner and outer flanges 106,108 out of the general plane of the ring seal 104 and therefore provides a greater degree of flexibility to allow the inner and outer flanges 106,108 to move towards and away from each other. This is illustrated diagrammatically in FIG. 7, which depicts the ring seal 104 adapting to a non-uniform annular gap 102 in which the lower part of the ring seal 104, in the orientation shown in the diagram, is stretched relative to the upper part, wherein the majority of the stretch is accommodated by the bridge 110.

The two radial flanges 106,108 of the ring seal may be secured to their respective mounting surfaces in any suitable way. Although not shown here, it is envisaged that the flanges 106, 108 could be adhesively bonded or mechanically fastened to the surfaces to which they are required to be attached. With reference to FIG. 4, it can be seen that the ring seal 104 is positioned so that it extends between a surface of the gearbox output shaft 38 and a surface of the sealing arrangement 70 and, as such, closes the annular gap 102. More specifically, in the illustrated embodiment, the ring seal 104 extends between respective adjacent axial-facing surfaces 112, 114 of the gearbox output shaft 38 and the sealing arrangement 102. The adjacent axial-facing surfaces 112, 114 are aligned in the axial direction along the rotational axis R.

The ring seal 104 may be attached to the associated mounting surfaces by any suitable means, including clamping rings and bolts, as is appropriate and as would be apparent to the skilled person.

In addition to closing the annular gap 102, the ring seal 104 serves as a radial linkage between the seal member 84 and the gearbox output shaft 38. Since the seal member 84 is mounted on the bearing 82, the ring seal 104 acts as a torque rest and as such makes seal member 84 rotate in synchronisation with the gearbox output shaft 38. Since the gearbox output shaft 38 rotates at a higher speed than the pitch tube 60, this helps to ensure the labyrinth seal operates optimally as such seals tend to be more effective at capturing leaking fluids due to the higher radial forces.

From the above discussion, it will be noted that the seal arrangement 70 is relatively compact in the axial direction along the rotational axis R. This means that the sealing function of the seal member 84 is predictable and reliable and does not take up excessive space in the annular volume 74 between the two shafts 38.60. Notably, the second portion 88 of the seal member 84 is positioned close to the bearing, as shown by the dimension D1 on FIG. 4. More specifically, dimension D1 is less than the radial distance of the annular volume 74 between the gearbox output shaft 38 and the pitch tube 60, which is indicated on FIG. 4 as dimension D2. The dimension D1 is also less than the diameter of the pitch tube 60, which is indicated as dimension D3. It will also be noted that the depth of the seal member 84, that is the axial length of the seal member 84 when oriented as shown in FIG. 4, as indicated by the dimension D4 is substantially equal to that of the dimension D2. What is more, due to the provision of the socket 92, the bearing (82) is accommodated within the axial length of the seal member 84 and, in this embodiment, does not protrude from the socket 92. This contributes to the space-efficient package of the seal arrangement 70.

The skilled person would appreciate that the illustrated embodiments are provided as an indication of one way in which the inventive concept may be implemented. Some variants have been described above, but others will be apparent. Therefore, the scope of the invention should be determined by the terms of the appended claims rather than the features of the illustrated embodiments.

Figure 8:
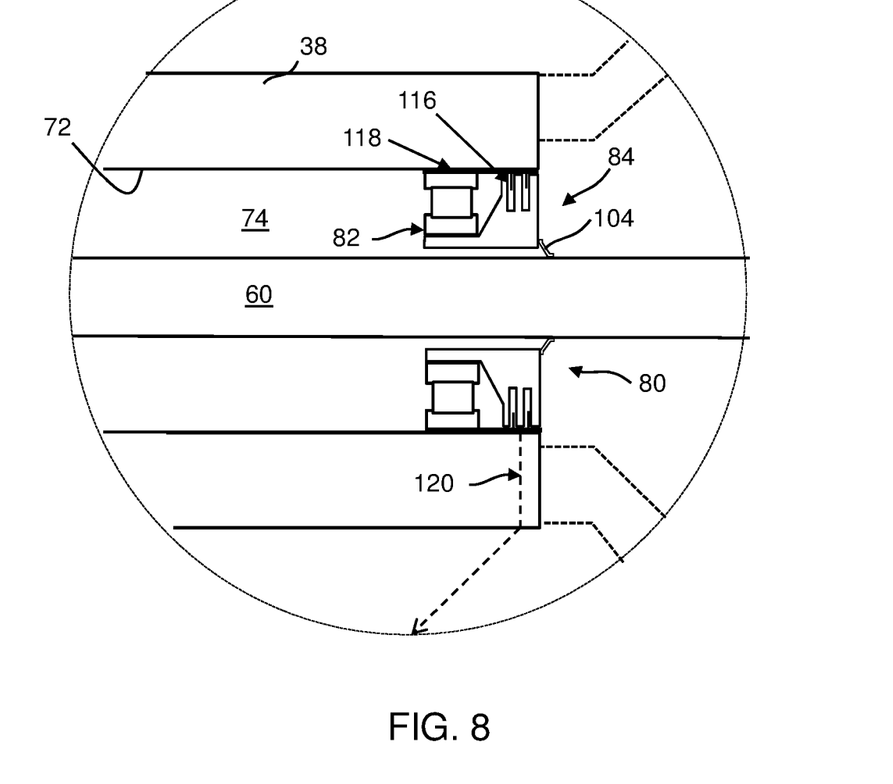
FIG. 8 is a view like that of FIG. 4, but showing an alternative embodiment of the invention.

In the embodiments discussed above, the seal arrangement 70 is configured to be mounted directly to the pitch tube 60 and also to seal against a running surface on the pitch tube 60. Expressed in another way, the seal arrangement 70 provides a radially inward facing seal. However, it is envisaged that the principles of the invention apply also to a seal arrangement that may be configured to provide a radially outer seal between two rotating shafts. Such a configuration is depicted in FIG. 8, in which it will be noted the components are common with the previous Figures, and so the same reference numerals will be used for clarity. A detailed description of this arrangement will not be provided and only the differences will be explained.

In this embodiment, the seal arrangement 70 is located in the same position as in FIG. 4, namely in the annular volume 74 between the pitch tube 60 and the generator output shaft 38 at an axial position adjacent to the open end of the gearbox output shaft 38. However, it will be apparent that the orientation of the seal arrangement 70 has been inverted so that the bearing 82 is fixed to the internal bore 72 of the gearbox output shaft 38 and the seal member 84 is opposed to and so seals against a running surface on the gearbox output shaft 38. It follows, therefore, that the annular gap 102 that is closed by the ring seal 104 is now defined by the radially inward surface of the seal arrangement 70 and the outer surface of the pitch tube 60. Notably in this embodiment there is provided an optional set of counter fins 116 mounted on a carrier 118. The counter fins 116 oppose the fins of the labyrinth sealing member 84 and thus provide additional isolation for the seal arrangement 70. More specifically, the counter fines 116 are interdigitated with the fins of the sealing member 84 as would be understood by the skilled person. The counter fins 116 and associated carrier 118 may form an annular component that could be received over the sealing member 84 and the bearing 82. The combined assembly of the counter fins 116/carrier 118, the sealing member 84 and the bearing 82 could therefore be installed as a single component.

A suitable drain channel 120 could be provided in the outer shaft 38 in order to drain leakage fluid from the seal arrangement 70 through to a suitable drain or sump.

In the above discussion, the seal arrangement 70 is located in the space between nested rotating shafts, such that the radially outer shaft 38 in effect is a rotating housing for the inner shaft/pitch tube 60. However, the invention may also be advantageous in applications where the radially inner shaft extends through a stationary housing.

The invention claimed is:

1. An apparatus, comprising:
a first shaft and a second shaft supported in a substantially concentric relationship so that they are able to rotate relative to one another about a rotational axis;
wherein one of the first and second shafts passes through a bore defined in the other of the first and second shafts;
a seal arrangement between the first and second shafts, said seal arrangement including a seal member and a bearing, the seal member being locked from rotational movement relative to said first shaft;
wherein the seal member comprises a first portion that is rotatably mounted on the second shaft by the bearing and a second portion that is configured to seal against a running surface defined by the second shaft.

2. The apparatus of claim 1, wherein the seal member comprises a radial surface that opposes the first shaft thereby defining an annular gap.

3. The apparatus of claim 2, wherein the seal arrangement includes a flexible annular seal that closes the annular gap.

4. The apparatus of claim 3, wherein the flexible annular seal extends between a surface of the first shaft and a surface of the seal member to close the annular gap.

5. The apparatus of claim 3, wherein the flexible annular seal extends between respective adjacent axial-facing surfaces of the first shaft and the seal member.

6. The apparatus of claim 3, wherein the flexible annular seal is a membrane seal.

7. The apparatus of claim 1, wherein the bearing on which the first portion of the seal member is mounted to the second shaft is a roller bearing.

8. The apparatus of claim 1, wherein the second portion of the seal member includes one or more sealing fins.

9. The apparatus of claim 1, wherein the second portion of the seal member includes a labyrinth seal.

10. The apparatus of claim 1, wherein the first shaft is a radially outer shaft through which passes the second shaft.

11. The apparatus of claim 1, wherein the first shaft is rotatable and wherein the second shaft is rotatable.

12. The apparatus of claim 1, wherein the second portion of the seal member is separated from the bearing by an axial distance along the rotational axis that is less than a radial distance of an annular volume defined between the first shaft and the second shaft.

13. The apparatus of claim 1, wherein the axial length of the seal member taken along the rotational axis is substantially the same as a radial distance of an annular volume defined between the first shaft and the second shaft.

14. The apparatus of claim 1, wherein the seal arrangement is carried by and seals against the second shaft.

15. The apparatus of claim 1, wherein the first portion of the seal member is directly attached to the bearing.

16. The apparatus of claim 1, wherein the first shaft and the second shaft define an annular volume radially disposed therebetween, and wherein the second portion of the seal member is disposed in the annular volume.

17. The apparatus of claim 1, further comprising at least one shaft support bearing for supporting the relative positioning of the first and second shafts, and wherein the bearing is different from the at least one shaft support bearing.

18. An apparatus, comprising:
a housing defining an internal bore;
a shaft that extends through the internal bore and which is rotatably mounted with respect to the housing so as to rotate around a rotational axis;
a seal arrangement between the internal bore of the housing and the shaft, said seal arrangement including a seal member and a bearing, the seal member being locked from rotational movement relative to said housing; wherein the seal member is spaced from the internal bore of the housing and includes a first portion that is rotatably supported on the shaft by the bearing and a second portion that is configured to seal against a running surface defined by the shaft.

* * * * *